C. A. DIETRICH.
RING OILING DEVICE FOR LOOSE PULLEYS, GEARS, &c.
APPLICATION FILED OCT. 21, 1918.
1,306,753.
Patented June 17, 1919.
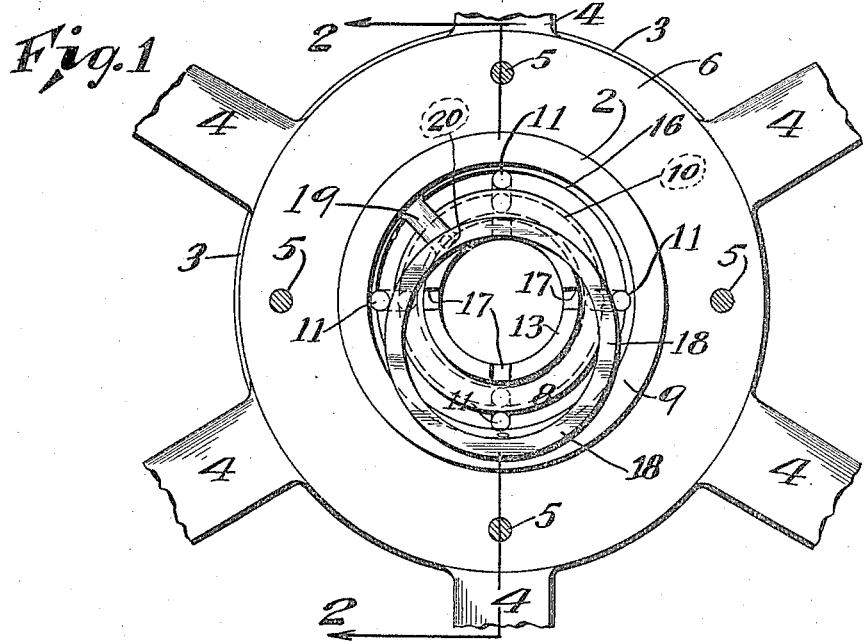
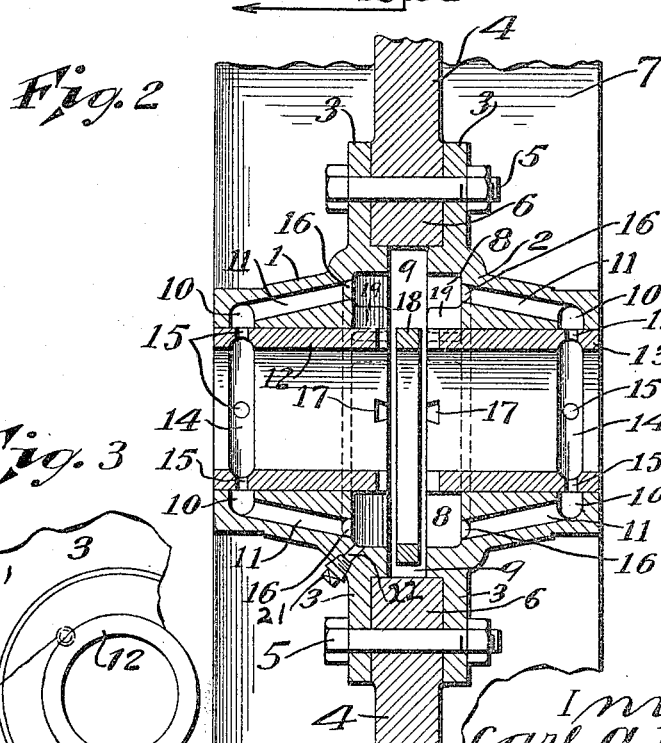
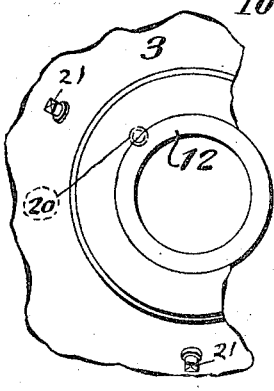
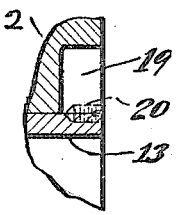
Inventor:
Carl A. Dietrich
By John C. Higden
Attorney.

UNITED STATES PATENT OFFICE.

CARL A. DIETRICH, OF ST. LOUIS, MISSOURI.

RING-OILING DEVICE FOR LOOSE PULLEYS, GEARS, &c.

1,306,753. Specification of Letters Patent. Patented June 17, 1919.

Application filed October 21, 1918. Serial No. 259,063.

*To all whom it may concern:*

Be it known that I, CARL A. DIETRICH, a citizen of the United States, residing at St. Louis, in the State of Missouri, have invented certain new and useful Improvements in Ring-Oiling Devices for Loose Pulleys, Gears, &c., of which the following is a specification containing a full, clear, and exact description, reference being had to the accompanying drawings, forming a part hereof.

My invention relates to an improved self-lubricating device for pulleys or other rotative machine elements, and it consists in the novel construction and arrangement of parts hereinafter described and claimed.

The object of my invention is to provide an improved self-oiling device which can be applied to loose-pulleys, sleeves used in conjunction with the hubs of loose-pulleys, friction-clutches, and gear-wheels, which shall be simple, durable, and inexpensive, and which shall have an oil reservoir that is adequate to maintain ample lubrication for a long time, and which will efficiently distribute the oil to the bearing-surfaces without wasting the lubricant.

In the present illustration of my invention I have shown the same applied to a loose pulley.

In the drawings,

Figure 1 is a side elevation of the hub of a loose pulley, having my invention applied thereto, one of the hub castings being removed, to show the internal construction.

Fig. 2 is a section of the complete self-oiling device, taken approximately on the line 2—2 of Fig. 1.

Fig. 3 is a fragmentary side-elevation of one of the hub castings and its bushing, and Fig. 4 is a detail view of the means used in securing the bushing in place.

The device here illustrated is made with two opposite hub castings 1 and 2 provided with annular flanges 3 by means of which said castings are secured to the arms 4 of the pulley, there being common bolts 5 passed through registering apertures in said flanges and arms.

Said pulley arms may be united at their inner ends by the usual web 6, as here shown; while in some cases the arms may be cast integral with one of said hub castings, so that the opposite hub casting may be bolted on.

The numeral 7 designates the rim of the pulley.

As will be seen, the two hub castings 1 and 2 form a large oil reservoir 8 between their inner ends, communicating at its outer side with an annular oil "well" 9, of which the inner periphery of the said arm-web 6 forms the outer wall, thus making said oil-well deeper but narrower than said reservoir proper.

Near the outer end of each of the said hub castings 1 and 2 is an annular internal groove 10, which is curved or V-shaped in cross-section, and these grooves are connected to said oil reservoir 8 by a plurality of inclined ducts or passages 11.

Said hub castings 1 and 2 have alined bores in which are located the alined bushings 12 and 13, in cases where bushings are used, and an annular internal groove 14 is formed near the outer end of each bushing and is connected to the said annular groove 10 adjacent to it by a plurality (four in the present case) of radial ducts or holes 15.

An annular groove 16 is formed in the outer wall of each half of said oil-reservoir 8, intercepting the inner ends of the said inclined ducts or passages 11 of said hub castings, for the purpose of facilitating the passage of the oil from said reservoir to said ducts.

Dovetail notches 17, (four of them in the present instance) are formed in the inner ends of the said bushings 12 and 13, to catch the oil and facilitate the lubrication of the shaft (not shown) that is in said bushings.

A heavy ring of metal 18 is loosely mounted in the oil-reservoir 8, and has sufficient diameter to hang upon the shaft (which is to be in the said bushings or sleeves 12 and 13) and extend into the said oil-well 9, and carry the oil therefrom onto said shaft, as well as to perform other functions hereinafter mentioned, in the space between the adjacent inner ends of said bushings.

To prevent the said ring 18 from accidentally leaving the said oil-well and getting "hung up" on the inner ends of the said bushings, I have provided a ring "knocker" 19, which (in the present illustration) is in the form of a small web of metal cast integral with the inner end of each of said hub castings 1 and 2, and extending radially toward the adjacent bushing, in the path of said ring so that it cannot get "hung up." (See Fig. 1.)

Any common substitute for this "knocker" may be employed, as (for instance) a pin extending radially from the bore of the hub casting inwardly to a point near the outer surface of the bushing, and located as is the said web 19 at or near the end of said bushing in said oil reservoir 8.

The bushings or sleeves 12 and 13 may be secured in the hub castings by any desired means, and in the present instance I have threaded a common gib or screw 20 into a hole which is drilled partially in the inner end of the bushing and partially in the adjacent radial web 19 of the hub casting. (See Fig. 4.)

The numeral 21 designates a filling plug, threaded into an oil passage 22 leading from the exterior to the interior of the oil reservoir 8, and I prefer to use two of these plugs and oil passages, located as shown in Fig. 3 a considerable distance apart, so that when the uppermost passage and plug are placed (by turning the pulley) at the top of the hub casting the other plug 21 and its oil passage 22 will be located about on a level with the oil line in said oil reservoir when same is full; and then when it is desired to fill the reservoir both plugs should be removed, and the oil be poured in through the upper oil passage until it shows at the lower one, thereby indicating to the workman that the reservoir is just full enough to let the oil reach up to the shaft or stud that the pulley is mounted upon, and not so full as to waste the oil.

The operation.

The construction of my device is such that the oil will be supplied to the bearing in ample quantities at all times, and under all reasonable conditions, either with the shaft revolving and the pulley standing still, or with the pulley revolving and the shaft standing still.

The oil-well 9 being made narrower and deeper than the oil-reservoir 8, the larger diameter of the former causes the centrifugal force to throw the oil into said oil-well, from which it is fed to the bearing by the ring 18, which (owing to its weight) is always in contact with the oil in said well, wherein (in case the pulley is revolving) it splashes the oil and causes it to be brought into contact with the shaft or journal.

In case the pulley is standing still and the shaft revolving, the ring 18 rolls around on said shaft and carries the oil continuously from said oil-well to the shaft, the shaft rotating said ring.

The notches 17 in the inner ends of the sleeves or bushings 12 and 13, cause the oil to work into the sleeves on the shaft which carries them, and so assist in the lubrication of the pulley-bearings, the dovetail (or inclined) walls of said notches forcing the oil inwardly in accordance with the well-known action of a propeller-blade.

Any oil that is thrown out of the said oil-reservoir 8 by centrifugal force, passes to the shaft through said inclined ducts 11, grooves 10, and radial holes 15, in some cases; in other cases the excess of oil, taken from the oil-well by said ring 18 and delivered to said shaft, will not be wasted, as it will be prevented from passing out of the bearings by the annular grooves 14 upon the interior of the sleeves or bushings, and will be returned to the oil-reservoir or oil-well by way of the said radial ducts or holes 15, annular grooves, 10, and inclined ducts 11.

The annular grooves 16, in the outer walls of the oil-reservoir, facilitate the passage and distribution of the oil.

The pulley or hub can be made without the said sleeves 12 and 13 as the cast-iron hub sections will wear a very long time without a sleeve.

I claim:

1. An improved ring oiling-device for loose pulleys and other machine elements, consisting of two hub sections having an oil reservoir between their inner ends, there being annular grooves near the outer ends of the interior of the bearing of said hubs, inclined ducts communicating at their inner ends with the said oil reservoir, and radial ducts connecting said inclined ducts to the said annular grooves; a heavy metal ring in said oil reservoir adapted to ride upon the shaft of the bearing and to carry the oil from said reservoir to the said shaft, and inclined walls adjacent said ring, for forcing the oil into the bearing.

2. An improved ring oiling-device for loose pulleys and machine elements, composed of two mating hub castings bolted together, with an annular oil reservoir between them, there being an annular oil-well that is deeper than said reservoir at the outer periphery of the latter; said castings having inclined oil ducts communicating at their inner ends with the said oil reservoir; two axially-alined sleeves or bushings placed within the bore of said hub castings and having annular grooves upon the interior of their bores near the outer ends of the latter, there being radial ducts which connect the said annular grooves with the said inclined ducts; a metal ring mounted in said oil reservoir and extending into said oil-well and adapted to ride upon the shaft of the bearing and carry the oil from said reservoir and oil-well to said shaft; and inclined oil-propelling walls which form the opposite faces of dovetail notches cut in the adjacent inner ends of said sleeves.

In testimony whereof I have signed my name to this specification in presence of two subscribing witnesses.

CARL A. DIETRICH.

Witnesses:
 JOHN C. HIGDON,
 FRANCES HOOVER ROSENBAUM.